United States Patent [19]

Koide et al.

[11] 4,269,036
[45] May 26, 1981

[54] FOOD DEFROSTING APPARATUS

[75] Inventors: Fumiharu Koide, Yokohama; Masami Ohshima, Musashino, both of Japan

[73] Assignees: Gomi Patent Office; Shinsei Reizo Kogyo Kabushiki Kaisha, both of Tokyo, Japan; a part interest

[21] Appl. No.: 66,654

[22] Filed: Aug. 15, 1979

[30] Foreign Application Priority Data

Aug. 23, 1978 [JP] Japan .................. 53-103199

[51] Int. Cl.³ .................. F25B 29/00; F25B 27/02; F25D 11/02
[52] U.S. Cl. .................. 62/159; 62/432; 62/238.6; 165/61
[58] Field of Search .................. 62/78, 79, 325, 238 E, 62/324 D, 159, 432; 426/524; 99/120; 165/61, 65, 58, 48, DIG. 25, DIG. 26

[56] References Cited

U.S. PATENT DOCUMENTS

| 2,292,335 | 8/1942 | Durbin | 62/159 |
| 2,787,128 | 4/1957 | Brown | 62/159 |
| 3,127,929 | 4/1964 | Ringquist | 62/159 X |
| 3,378,062 | 4/1968 | Ringquist et al. | 62/159 X |
| 4,002,199 | 1/1977 | Jacobs | 165/61 |

OTHER PUBLICATIONS

*Electrical West*, vol. 66, No. 4, Apr. 1931, pp. 177–179, W. R. Chawner, "2 Mill Commercial Heat by Refrigeration Cycle", copy in Gp 344–C162.

*Primary Examiner*—Lloyd L. King
*Attorney, Agent, or Firm*—Oblon, Fisher, Spivak, McClelland & Maier

[57] ABSTRACT

Food defrosting apparatus comprising a refrigerator, a pair of thawing and storage water tank evaporators which cooperate with the refrigerator to form independent first heat exchanging circuits, respectively, a pair of thawing and storage water tanks in which are contained the thawing and storage water tank evaporators, respectively, a pair of thawing and storage heat exchangers which cooperate with the thawing and storage water tanks to form independent secondary heat exchanging circuits, respectively, and a common cabin in which are contained the thawing and storage heat exchangers, whereby freeze food in the cabin can be first thawed and subsequently preserved in readiness for further processing.

4 Claims, 1 Drawing Figure

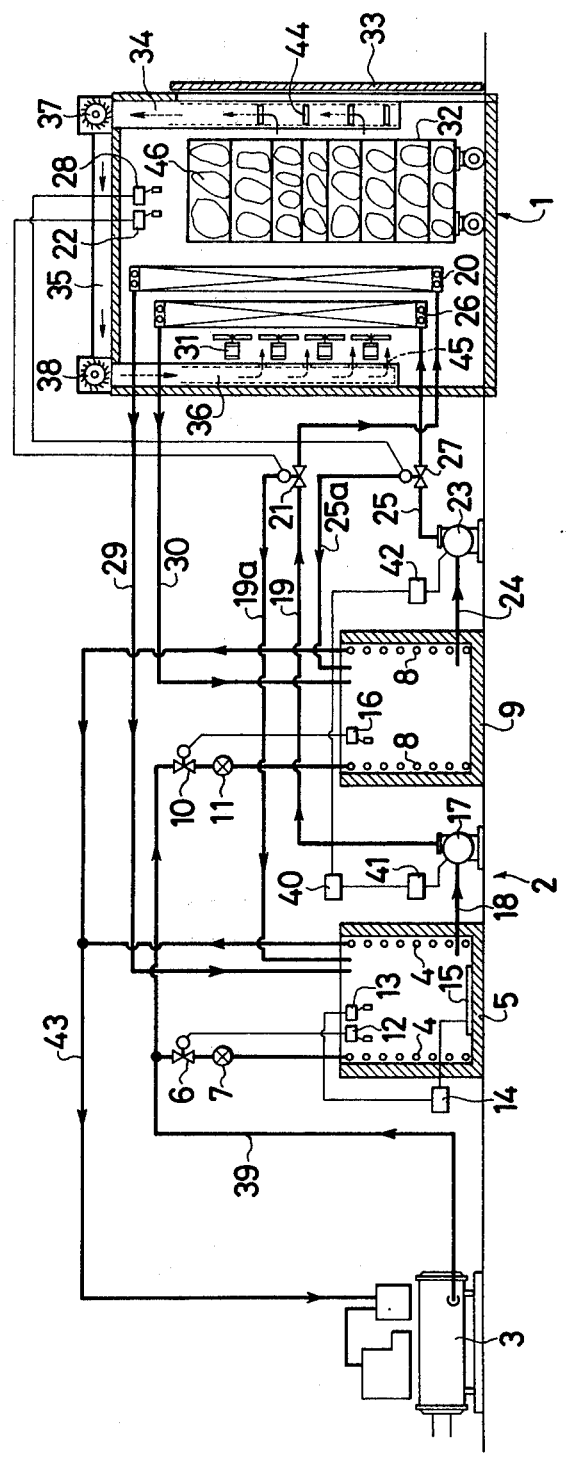

FOOD DEFROSTING APPARATUS

BACKGROUND OF THE INVENTION

This invention relates to a food defrosting cabin or apparatus for promptly thawing deep freeze storage food for further processing.

It is customary in the art to provide a large quantity of food, such as meat and marine fishes, in a deep freeze storage condition at a temperature of from about 20° to 25° C. In actual uses, the deep freeze food is required to be thawed quickly and without losing the natural appearance and quality of the product.

While various means have been provided in the art to attain such a purpose, none have proven to be entirely sufficient, particularly in simplifying and facilitating operation of the apparatus.

A principal object of the invention is therefore to provide a food defrosting cabin which can thaw the deep freeze storage food within a shorter period of time and thereafter can preserve the product in the thawed condition and ready for further processing.

Another object of the invention is to provide a simpler heat exchange and controlling device for the apparatus with added convenience of handling to the user.

SUMMARY OF THE INVENTION

The foregoing object and others are attained according to at least one aspect of provision of heat exchange means using water as a refrigerant for thawing the deep freeze food and thereafter for secondary the product in readiness for further processing.

Therefore an embodiment according to the invention comprises, a refrigerator using as a first or primary refrigerant a known refrigerant sold under a trade name "Freon", a pair of thawing and storage water tank evaporators through which the first refrigerant passes, a pair of thawing and storage water tanks in which are immersed the thawing and storage water tank evaporators, respectively, a pair of thawing and storage heat exchangers through which the water as secondary refrigerant passes from the thawing and storage water tanks, respectively, and a common cabin within which are contained the heat exchangers acting in succession so that the deep freeze food is first thawed and thereafter preserved in readiness for a further processing purpose.

BRIEF DESCRIPTION OF THE DRAWING

The FIGURE is a diagrammatic, patially cross sectioned, view of an apparatus according to the invention.

DESCRIPTION OF THE PREFERRED EMBODIMENT

An apparatus according to the invention shown comprises a cabin generally designated by the numeral 1 and mechanical equipment also generally designated by the numeral 2. A refrigerator 3 is fluidly connected to a thawing water tank evaporator in a thawing water tank 5 through an electromagnetically operable valve 6 and an expansion valve 7, on a delivery line 39. The refrigerator 3 is further fluidly connected to a storage water tank evaporator 8 in a storage water tank 9 through an electromagnetically operable valve 10 and an expansion valve 11. The electromagnetically operable valve 6 is electrically connected to a thermostat 12 immersed into water in the thawing water tank 5. In the tank is another thermostat 13 immersed in the water and electrically connected to an electromagnetically operable switch 14 interposed between a heater 15 immersed in the water and an electric supply source (not shown).

The storage water tank 9 is provided with a thermostat 16 immersed in the water in the tank and electrically connected to the electromagnetically operable valve 10.

A pump 17 is connected through a suction line 18 to the thawing water tank 5 and further connected through a delivery line 19 to a thawing heat exchanger 20 in the cabin 1. On the line 19 is a electromagnetially operable three way cock 21 which is electrically connected to a thermostat 22 in the cabin. A second pump 23 is fluidly connected through a suction line 24 to the storage tank 9 and further connected through a delivery line 25 to a storage heat exchanger 26 in the cabin 1. On the delivery line 25 is an electromagnetically operable three way cock 27 which is connected electrically to another thermostat 28 in the cabin 1. The thawing heat exchanger 20 is fluidly connected through an exhaust line 29 to the thawing water tank 5 while the other storage heat exchanger 26 is in fluid connection through an exhaust line 30 with the storage water tank 9.

The three way cock 21 is fluidly connected through a bypass line 19a to the thawing water tank 5 while the other three way cock 27 is fluidly connected through a bypass line 25a to the storage water tank 9.

The cabin 1 is provided with a set of fans 31 interposed between the heat exchangers 26 and the wall of the cabin 1 in order to produce an air flow across the heat exchangers 26 and 20. The cabin defines a space between the heat exchanger 20 and a door 33 sufficiently to contain a wagon 32 of multiple shelf type on which are sustained a number of vats receiving the freeze foods 46. As shown, a set of ducts 34 to 36 cooperate to form a path through which circulates a stream of air flow as shown by the arrows in the view. Blowers 37 and 38 are driven by a motor (not shown) to energize the circulation of air. The duct 34 has a set of suction openings 44 while the other duct 36 has a set of discharging openings 45 so that the air circulating circuit is formed across the heat exchangers 26 and 20 and the space containing the wagon 32.

The electric motors 17 and 23 are electrically connected to a common timer switch 40 across electromagnetically operable switches 41 and 42, respectively. Each of the heat exchangers 4 and 8 is connected through an return line 43 to the refrigerator 3.

In operation, the water in the thawing tank 5 is kept at a temperature of from 10° to 15° C. When the temperature increases beyond the maximum, the thermostat 12 senses this and an output signal is discharged therefrom. The electromagnetically operable valve 6 is opened in response to the signal so that a circuit is formed for circulating the refrigerant, "Freon", by refrigerator 3, line 39, electromagnetically operable valve 6, expansion valve 7, thawing water tank evaporator 4 and return line 43. When the temperature of the water in the thawing water tank 5 is decreased below the maximum, a reverse signal is discharged from the thermostat 12 and reversal takes place as will be understood by those skilled in the art. In case where the temperature decreases below the minimum, the thermostat 13 senses this and discharges an output signal. The electromagnetically operable switch 14 closes in response to the signal to connect the heater 15 to the non-illustrated electric supply source to thereby heat the water until the temperature thereof is increased beyond the minimum. The temperature of the water in the thawing tank 5 is thus kept within the preset range of from 10° to 15° C.

In a similar manner to that as above described, water in the storage tank 9 is kept at a temperature of about −10° C. by the similar operation by the thermostat 16 and the electromagnetically operable valve 10.

The timer switch 40 is first set so as to close the electromagnetically operable switch 41 so that the pump 17 is driven for an intended time period, for example 10 hours. The water in the thawing tank 5 is accordingly circulated through the circuit formed of tank 5, line 18, pump 17, line 19, electromagnetically operable three way cock 21, thawing heat exchanger 20 in the cabin 1, and line 29. Since the water in the tank 5 is kept at a comparatively higher temperature of 10° to 15° C., normally, the freeze food in the cabin 1 is gradually thawed and the intended thawed condition, of the food is attained until the preset thawing period of about 10 hours terminates.

If the temperature in the cabin 1 is increased over the set temperature, 10° to 15° C., the thermostat 22 senses this and an output signal is discharged therefrom. In response to the signal, the three way cock 21 isolates the thawing heat exchanger 20 from the thawing water tank 5 and at the same time communicates the line 19 with the tank 5 through the bypass line 19a. If the ambient temperature in the cabin is decreased below the preset minimum, reversal takes place, so that the temperature in the cabin is kept within the preset range. It should be noted that the pump 17 is continuously driven during the preset period of time in dependency upon the timer switch 40.

After the preset period of time for defrosting the freeze food, a preserving operation of the apparatus begins by the storage circuit formed by preserving water tank 9, line 24, pump 23, line 25, electromagnetically operable three way cock 27, storage heat exchanger 26, and line 30. Since the temperature of the secondary refrigerant water in the tank 9 is about −10° C. and kept constant, the ambient temperature in the cabin 1 can be kept at a temperature of, for example, −3° C., which is considered generally suitable for preserving the food in ready to further processing condition, by cooperation of thermostat 28 and three way cock 27 in a similar manner. The bypass line 25a serves to return the water into the storage water tank 9 when the valve 27 isolates the heat exchanger 26 from the tank 9.

I have found that, in actual test, frozen pork meat at a temperature of from −20° to −25° C., of 100 mm thickness, 200 mm by 500 mm, was thawed during a period of time of about 5 hours into a condition in which core temperature of the food was −3° C. and surface temperature of the food was −0° C., Such product can be kept in ready for further processing condition under the ambient condition described in the foregoing.

I have found in an actual test that a temperature differential derived from the apparatus according to the invention can beneficially be operated with less chattering of the temperature controlling parts, such as, thermostats 12, 13, 16, 22, and 28. This may be safely attributed to the high specific heat of the water. The above property of the apparatus of the invention is considered beneficial to simplify structure of the apparatus and facilitate the method for operating the apparatus.

It should be noted that the water in both tanks 5 and 9 must be prepared with a known antifreezing solution in order to prevent the water from freezing.

What is claimed is:

1. In a food defrosting and storing apparatus for a cabin, a refrigeration system including a thawing water tank evaporator and a storage water tank evaporator, a thawing water tank containing the thawing water tank evaporator, a storage water tank containing the storage water tank evaporator, a heater means in the thawing water tank, a first electromagnetically operable switch electrically connected to the heater means, an electric supply source, a first thermostat in the thawing water tank electrically connected to the first electromagnetically operable switch for controlling the first switch in dependency upon the temperature of the water in the thawing water tank, a first line for delivering refrigerant medium into the thawing water tank evaporator, a first branch line connecting the first line and the storage water tank evaporator for delivering refrigerant medium into the storage water tank evaporator, a second line for discharging refrigerant medium from the thawing water tank evaporator, a second branch line connecting the second line and the storage water tank evaporator for discharging refrigerant medium from the storage water tank evaporator, a first expansion valve on the first line, a first electromagnetically operable valve on the first line, a second thermostat in the thawing water tank electrically connected with the first electromagnetically operable valve for controlling the first valve in dependency upon the temperature of the water in the thawing water tank, a second expansion valve on the first branch line, a second electromagnetically operable valve on the first branch line, a third thermostat in the storage water tank and electrically connected to the second electromagnetically operable valve for controlling the second valve in dependency upon the temperature of the water in the storage water tank; a thawing water circulation system including a thawing heat exchanger in the cabin, a thawing water delivery circuit connecting the thawing water tank and the thawing heat exchanger, a thawing water discharging circuit connecting the thawing heat exchanger and the thawing water tank, an electrically driven first pump on the thawing water delivery circuit for conducting thawing water from the thawing water tank to the thawing heat exchanger, a first bypass circuit connecting an upstream portion on the thawing water delivery circuit of the thawing heat exchanger to the thawing tank, a third electromagnetically operable valve at the upstream portion on the thawing water delivery circuit for providing a passage of thawing water bypassing the thawing heat exchanger back into the thawing water tank through the first bypass circuit, and a fourth thermostat in the cabin electrically connected to the third electromagnetically operable valve for controlling the third valve in dependency upon the temperature in the cabin; a storage water circulation system including a storage heat exchanger in the cabin, a storage water delivery circuit connecting the storage water discharging circuit connecting the storage heat exchanger and the storage water tank, an electrically driven second pump on the storage water delivery circuit for conducting storage water from the storage water tank to the storage heat exchanger, a second bypass circuit connecting an upstream portion on the storage water delivery circuit of the storage heat exchanger to the storage water tank, a fourth electromagnetically operable valve at the upstream portion on the storage water delivery circuit for providing a passage of storage water bypassing the storage heat exchanger back into the storage water tank through the second bypass circuit, and a fifth thermostat in the cabin electrically connected to the fourth electromagnetically operable valve in dependency upon the temperature in the cabin.

2. A food defrosting and storing apparatus as set forth in claim 1 wherein the cabin is in the form of a cube and has an opening in one side wall for ingress and egress of the food and a door means for closing the opening, said storage heat exchanger and said thawing heat exchanger being disposed adjacent a rear side wall of the cabin opposite to the opening with a space defined between the opening and the thawing heat exchanger for containing food supporting means therein.

3. A food defrosting and storing apparatus as set forth in claim 2 wherein, the cabin is provided with blower means for forcibly circulating air across the heat exchangers, said blower means including a first vertical duct disposed between the storage heat exchanger and the rear side wall of the cabin, a second vertical duct disposed in the opposite side wall relative to the rear side wall and in side by side relation with the opening, a connecting duct connecting the first and second vertical ducts at the uppermost ends thereof, said first duct having a plurality of discharging opening directed toward the storage heat exchanger, said second vertical duct having a plurality of suction openings, and at least one blower member in one of the ducts.

4. A food defrosting and storing apparatus as set forth in claim 3 wherein, the cabin is further provided with at least one fan member disposed between the first duct and the storage heat exchanger for increasing the velocity of the stream of air through the ducts and heat exchangers.

* * * * *